US012574848B2

(12) United States Patent
Berggren et al.

(10) Patent No.: US 12,574,848 B2
(45) Date of Patent: Mar. 10, 2026

(54) METHOD FOR CONTROLLING COMMUNICATION IN DRX

(71) Applicant: Sony Group Corporation, Tokyo (JP)

(72) Inventors: Anders Berggren, Lund (SE); Nafiseh Mazloum, Lund (SE); Torgny Palenius, Barsebäck (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 846 days.

(21) Appl. No.: 17/774,836

(22) PCT Filed: Oct. 14, 2020

(86) PCT No.: PCT/EP2020/078898
§ 371 (c)(1),
(2) Date: May 5, 2022

(87) PCT Pub. No.: WO2021/089284
PCT Pub. Date: May 14, 2021

(65) Prior Publication Data
US 2022/0394619 A1     Dec. 8, 2022

(30) Foreign Application Priority Data
Nov. 8, 2019     (SE) .................................... 1951294-6

(51) Int. Cl.
*H04W 52/02*          (2009.01)
*H04W 76/28*          (2018.01)
(52) U.S. Cl.
CPC ... *H04W 52/0232* (2013.01); *H04W 52/0274* (2013.01); *H04W 76/28* (2018.02)

(58) Field of Classification Search
CPC ......... H04W 52/0232; H04W 52/0274; H04W 76/28
(Continued)

(56) References Cited

U.S. PATENT DOCUMENTS 12,022,393 B2 * 6/2024 Ye ..................... H04W 52/0232
2012/0120828 A1  5/2012 Anderson
(Continued)

FOREIGN PATENT DOCUMENTS

CN          101801071 A       8/2010
CN          103209469 A       7/2013
(Continued)

OTHER PUBLICATIONS

R1-1910233,"Remaining aspects of PDCCH-based power saving signal", 3GPP TSG RAN WG1 #98bis, source vivo (Year: 2019).*
(Continued)

*Primary Examiner* — Intekhaab A Siddiquee
(74) *Attorney, Agent, or Firm* — Tucker Ellis LLP

(57) ABSTRACT

A method for controlling a terminal to receive signaling from a wireless network during discontinuous reception, DRX, the method being carried out in the terminal and comprising determining (604) a time offset (ΔTO) between a first window (41) for monitoring a wake-up signal, WUS, occasion and a subsequent second window (42) for monitoring signal reception responsive to receiving a WUS in the first window, wherein said time offset is dependent on a characteristic (62) associated with a downlink signal from the wireless network in accordance with a predetermined rule.

21 Claims, 5 Drawing Sheets

(58) Field of Classification Search
USPC ........................................................ 370/318
See application file for complete search history.

(56) References Cited

U.S. PATENT DOCUMENTS

| | | | |
|---|---|---|---|
| 2018/0234919 A1 | 8/2018 | Tsuda | |
| 2019/0239189 A1 | 8/2019 | Hwang et al. | |
| 2019/0254110 A1 | 8/2019 | He | |
| 2019/0268931 A1 | 8/2019 | He | |
| 2020/0107266 A1* | 4/2020 | Liao | H04W 76/28 |

FOREIGN PATENT DOCUMENTS

| | | |
|---|---|---|
| CN | 103298083 A | 9/2013 |
| CN | 109923914 A | 6/2019 |
| KR | 20100052064 A | 5/2010 |
| WO | 2019033112 A1 | 2/2019 |
| WO | WO-2019143937 A1 | 7/2019 |
| WO | WO-2019168660 A1 | 9/2019 |

OTHER PUBLICATIONS

R2-1807744, "Remaining aspects of PDCCH-based power saving signal", 3GPP TSG-RAN WG2 Meeting #102, source MediaTek Inc. (Year: 2018).*
Huawei, Hisilicon, "Add gap determination to wake-up signal" R2-1811818, 3GPP TSG-RAN WG2 #103, Gothenburg, Sweden, Aug. 10, 2018.
International Search Report and Written Opinion from corresponding International Application No. PCT/EP2020/078898 mailed on Feb. 1, 2021; 11 pages.
VIVO: "Remaining aspects of PDCCH-based power saving signal"; 3GPP Draft; vol. RAN WG1, dated Oct. 4, 2019; 14 pages.
Mediatek Inc.: "WUS time configuration"; 3GPP Draft; vol. RAN WG2, dated May 20, 2018; 5 pages.
Mediatek Inc.: "Wake up Signal Configuration for NB-IoT"; vol. RAN WG1, dated May 20, 2018; 6 pages.
Sony: "On PDCCH-based power saving channel for UE power saving"; 3GPP Draft; vol. RAN WG1, dated Nov. 9, 2019; 8 pages.
Office Action and Swedish Search Report from corresponding Swedish Application No. 1951294-6; mailed on Aug. 28, 2020, 8 pages.
Intel: "Considerations on PDCCH-based power saving signal"; 3GPP Draft, R1-1908656; dated Aug. 17, 2019; 9 bages.
Huawei: "PDCCH-based power saving signal/channel"; 3GPP Draft; R1-1910076; dated Oct. 5, 2019; 21 pages.

* cited by examiner

Fig. 5A                  Fig. 5B

METHOD FOR CONTROLLING COMMUNICATION IN DRX

TECHNICAL FIELD

This disclosure relates to methods and devices in a wireless communication system, adapted to control communication between a wireless network and a terminal during discontinuous reception (DRX). Specifically, solutions are provided for determining a time offset between a window for wake-up signal detection in the terminal and a subsequent window for communication in a DRX On duration.

BACKGROUND

In radio communication systems, such as various generations provided through the 3rd Generation Partnership Project (3GPP), various specifications have been provided for setting up common rules for setting up and operating both a wireless radio interface between a wireless terminal and a network node, and various levels of operation of the network. In 3GPP documentation, a terminal is commonly referred to as a User Equipment (UE), but will alternatively be referred to herein as a terminal. Such terminals are connectable to a core network by means of a radio access network RAN, which includes one or more network nodes, operative to provide radio access to terminals within a cell. Such network nodes may also be referred to as an access node or a base station, and various terms are used in 3GPP for different types of systems or specifications. In the so-called 4G specifications, also referred to as Long-Term Evolution (LTE), the term eNodeB (eNB) is used to denote a network node.

After successful implementation and use of the 4G communication system, efforts to develop an improved 5G communication system or a pre-5G communication system have been conducted. For this reason, the 5G communication system or the pre-5G communication system is called a communication system beyond 4G network, and also New Radio (NR), developed to support 5G RAN (Radio Access Network). This new 5G RAN is able to operate both in connection to a 4G Core network (EPC), or a 5G core network 5GC. A network node configured to operate in a 5G radio access network may be denoted a gNB.

With the introduction of technical specifications and frameworks for machine type communication, the number of terminals is expected to grow rapidly over the coming years. 3GPP already introduced two complementary narrowband LTE IoT technologies in Release 13: eMTC (enhanced machine-type communication) and NB-IoT (narrowband Internet of Things). Both were optimized for inter alia lower complexity/power. With the objective to reduce the total energy cost of terminals, the notion of a wake-up signal (WUS) was agreed for introduction to MTC in 3GPP rel.15. The WUS is used in idle mode of the terminal and is expected to be sent prior to the paging indicator using a known sequence of symbols. The notion is that the terminal only decodes the control channel and the subsequent data shared channel if it detects the WUS carrying certain information related to it.

Recently, in NR Release 16, a new power saving scheme is introduced to enhance power saving during a duty-cycling mechanism, referred to as the DRX cycle, as shown in FIG. 1A. Contrary to the mechanism previously discussed for MTC, this power saving scheme may be used when the terminal is in connected mode with the wireless network. The DRX cycle consists of short periods, denoted Active Time, or the DRX ON period, where potential new communication sessions may be started, and periods where the UE can sleep. In this new power saving scheme, a UE monitors the channel outside Active Time for a potential power saving signal, i.e. a PDCCH with CRC scrambled by Power-Saving Radio Network Temporary Identifier (PS-RNTI), being configured on a bandwidth part (BWP) in an active cell. The power saving signal is alternatively referred to as a WUS herein, which denotes its purpose. The rationale is that only in case a WUS transmitted in a WUS occasion is detected in the terminal, such as within the PDCCH with CRC scrambled by PS-RNTI, the UE will wake-up and proceed to the subsequent operation, such as further decoding PDCCH (scheduling DCI) or PDSCH being transmitted during the Active Time of DRX ON. A time period is required between the transmission of the wakeup signal or indicator and the start of DRX ON to ensure the UE has sufficient time after monitoring the WUS to prepare for the subsequent operation e.g. decoding PDCCH or PDSCH during the Active Time, if a WUS indicator is detected. The time period between the time when the monitoring of the wake-up signal starts and when the DRX ON starts may be referred to as PS_offset.

The PS_offset value used may typically be configured by the wireless network. However, dependent on the situation, it may be suitable to change or modify the offset. There is thus a need for a mechanism for controlling the offset in convenient way, and which serves to ensure proper activation of a receiver in the terminal for reception in the DRX ON period, based on WUS detection.

SUMMARY

In view of the mentioned ongoing development in wireless communication and the associated presented challenges, various solutions for determining the time offset are provided herein, and as set out in the independent claims.

According to a first aspect, a method is provided herein for controlling a terminal to receive signaling from a wireless network during discontinuous reception, DRX, the method being carried out in the terminal and comprising determining a time offset between a first window for monitoring a wake-up signal, WUS, occasion and a subsequent second window for monitoring signal reception responsive to receiving a WUS in the first window, wherein said time offset is dependent on a characteristic associated with a downlink signal from the wireless network in accordance with a predetermined rule.

By providing a predetermined rule for determining the time offset, a suitable time offset that the terminal can abide to may be configured, rather than the terminal and the network having to communicate to set up the time offset.

According to a second aspect, a method is provided for controlling an access node of a wireless network for communication with a terminal using DRX, the method being carried out in the access node and comprising determining DRX characteristic for communication with the terminal;

determining, using a predetermined rule dependent on said characteristic, a time offset between a first window for a wake-up signal, WUS, occasion and a subsequent second window for signal transmission in a DRX on period.

According to a third aspect, a terminal configured for controlling detection of signaling from a wireless network during DRX is provided, comprising logic for carrying out a method in accordance with any of the embodiments outlined herein.

According to a fourth aspect, an access node of a wireless network for communication with a terminal using DRX is provided, comprising logic for carrying out a method in accordance with any of the embodiments outlined herein.

Various embodiments are set out in the dependent claims.

BRIEF DESCRIPTION OF THE DRAWINGS

Various embodiments will be described with reference to the drawings, in which

FIGS. 5A to 5C schematically illustrates different scenarios of bandwidth allocation for wake-up signaling and subsequent PDCCH reception in the DRX On Period, usable for controlling the time offset in various embodiments.

DETAILED DESCRIPTION

Figure 1A:
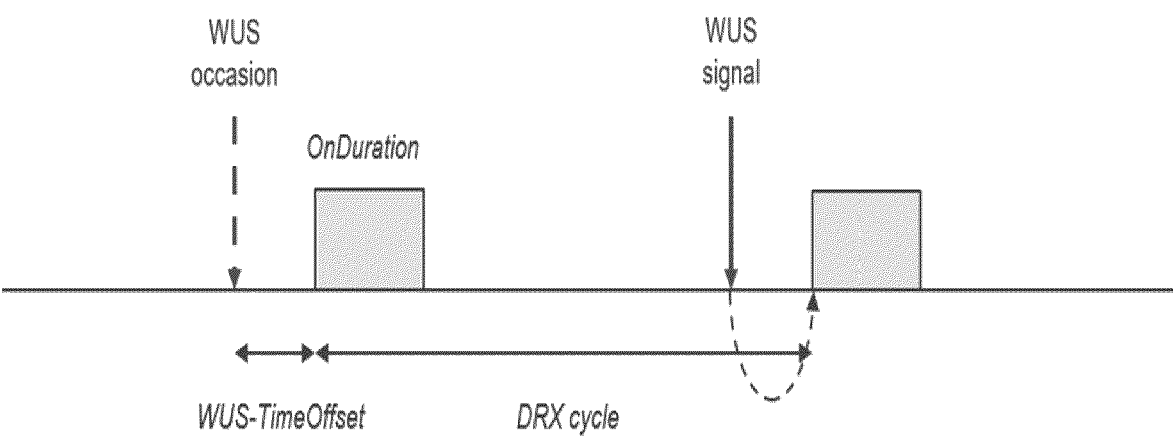
FIG. 1A schematically illustrates the general concept of wake-up signaling prior to a window of active downlink reception during DRX operation.

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Various embodiments are outlined herein, generally suitable for employment in a 3GPP radio communication system, such as NR, but any type of wireless communication system operating with a wake-up signal usable for activating a reception window may employ the suggested solutions. For this reason, the term terminal or UE will generally be used to denote a wireless device connectable by e.g. radio communication with a wireless network, and the term access node or base station will be used to denote a node of the wireless network configured to provide wireless access to terminals within a certain cell or coverage area.

Figure 1B:
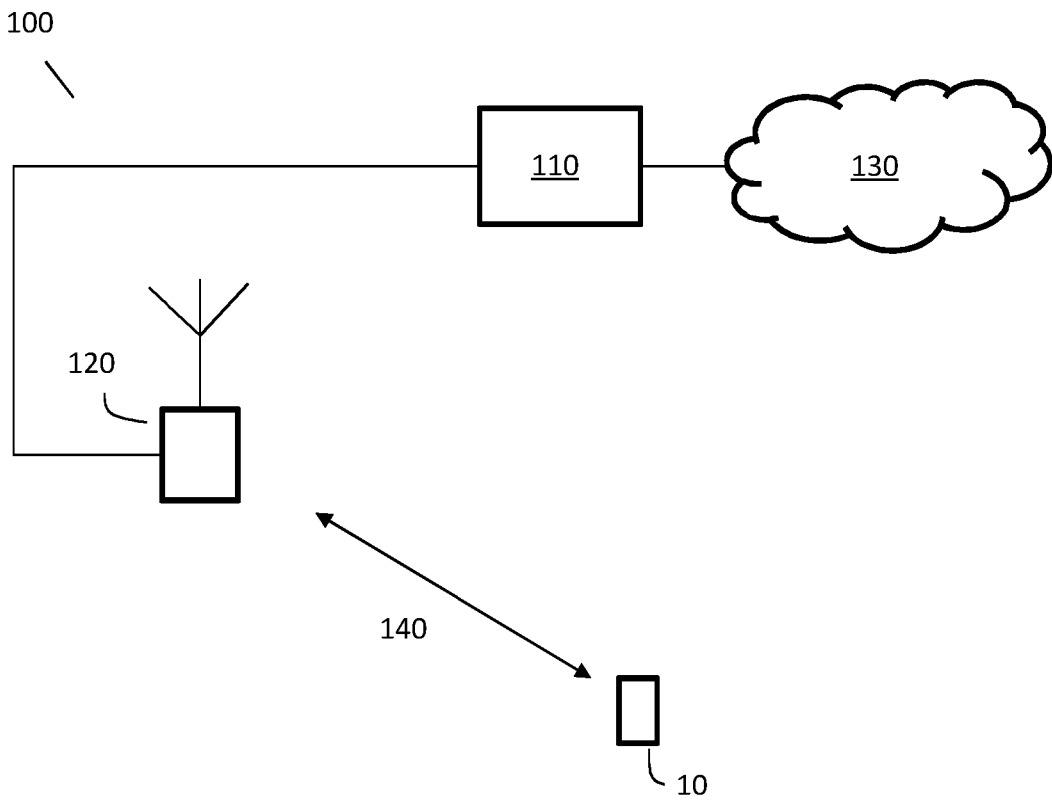
FIG. 1B schematically illustrates a wireless communication system providing for communication between an access node of a wireless network and a terminal.

FIG. 1B schematically illustrates a wireless communication system including a wireless network 100, and a terminal (or UE) 10 configured to wirelessly communicate with the wireless network 100. The wireless network may be a radio communication network operating under general and specific regulations and limits published by the 3GPP, such as a New Radio (NR) network. The wireless network 100 may include a core network 110, which is connected to other networks 130, such as the Internet. The wireless network 100 further includes an access network which may comprise a plurality of access nodes, of which access node 120 is shown. An access node is an entity executing the wireless connection with wireless terminals 10. As such, the access node 120 comprises or is connected to a transmission point TRP including an antenna arrangement for transmitting and receiving radio signals. The access node 120 may be a gBN and be configured for beamforming as introduced for 5G. The access node 120 may also be referred to as a base station.

The wireless terminal 10 may be any device operable to wirelessly communicate with the network 100 through the radio access node 120, such as a mobile telephone, computer, tablet, a M2M device or other. In the embodiments outlined herein, the terminal is capable of communicating under DRX with the wireless network (100).

Figure 2:
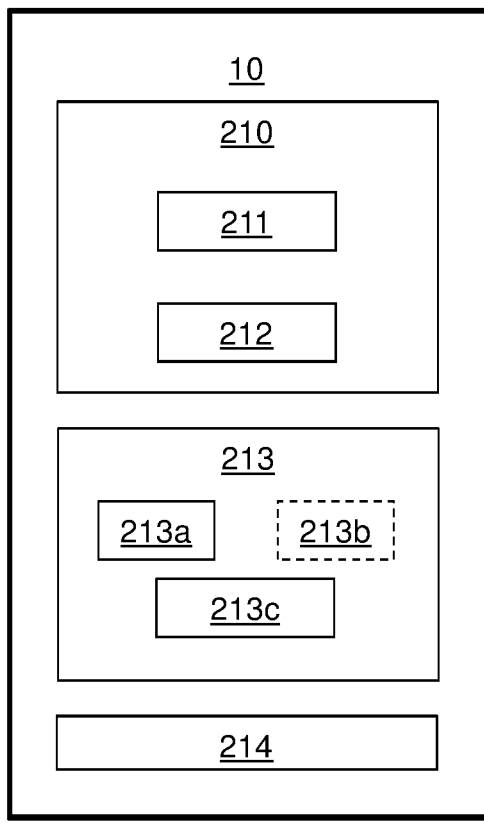
FIG. 2 schematically illustrates a radio communication terminal configured to operate according to various embodiments.

FIG. 2 schematically illustrates an embodiment of the terminal 10 for use in a wireless network 100 as presented herein, and for carrying out the method steps as outlined.

The terminal 10 may comprise a radio transceiver 213 for communicating with other entities of the radio communication network 100, such as the access node 120. The transceiver 213 may thus include at least one radio receiver 213a, 213b and a transmitter 213c for communicating through at least an air interface. In various embodiments, the terminal 10 may be configured with a separate low-power receiver 213b, operable for detecting e.g. a WUS, in addition to a main receiver 213a. This way the main wireless receiver 213a need only be activated once a WUS is detected. In some embodiments, the receiver function 213b need not be a separate receiver, but rather a configuration of the main receiver 213a for reduced function or operation. In yet another embodiment, the transceiver may comprise a low power WUS receiver 213b, which has a low power consumption and needs a long gap before DRX_ON, and in addition a normal WUS receiver 213d (not shown) which consumes more power than the low power receiver 213b. The low power receiver 213b is suitable to use on the default BWP. The normal WUS receiver will also need a transition time before the main receiver 213a can be booted up for use in DRX_ON and may be suitable for use on the active BWP. The objective is to reduce power consumption, since the added receiver would be configured to consume less power than the main receiver. Dependent on whether or not a low power receiver 213b is included, or whether the terminal 10 is arranged to use it, the terminal 10 may use the main wireless receiver 213 also for WUS detection, in addition to detecting control signals, synchronization signals and communicating data in a DRX On Period.

The terminal 10 further comprises logic 210 configured to communicate data, via the radio transceiver, on a radio channel, to and from the wireless network 100.

The logic 210 may include a processing device 211, including one or multiple processors, microprocessors, data processors, co-processors, and/or some other type of component that interprets and/or executes instructions and/or data. Processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage mediums. For example, memory storage 212 may include a random access memory (RAM), a dynamic random access memory (DRAM), a cache, a read only memory (ROM), a programmable read only memory (PROM), flash memory, and/or some other type of memory. Memory storage 212 may include a hard disk (e.g., a magnetic disk, an optical disk, a magneto-optic disk, a solid state disk, etc.).

The memory storage 212 is configured for holding computer program code, which may be executed by the processing device 211, wherein the logic 210 is configured to control the terminal 10 to carry out any of the method steps as provided herein. Software defined by said computer program code may include an application or a program that provides a function and/or a process. The software may include device firmware, an operating system (OS), or a variety of applications that may execute in the logic 210.

The terminal 10 may further comprise an antenna 214, which may include an antenna array.

Obviously, the terminal may include other features and elements than those shown in the drawing or described herein, such as a power supply, a casing, a user interface, sensors etc.

Figure 3:
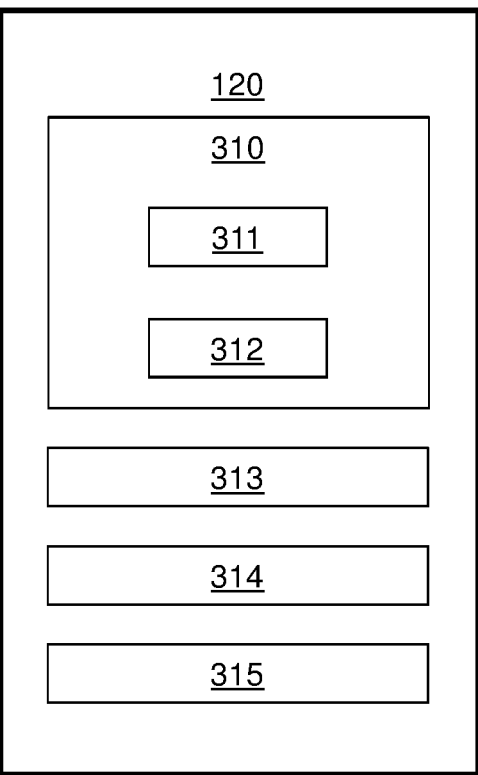
FIG. 3 schematically illustrates an access node configured to operate according to various embodiments.

FIG. 3 schematically illustrates an access node 120 for use in a wireless network 100, such as a radio communication network, configured for carrying out the method steps as outlined herein.

The access node 120 includes or operates as a base station of a radio communication network 100, such as a gNB, and may be configured for operation in a mm wave frequency band.

The access node 120 may comprise a radio transceiver 313 for wireless communication with other entities of the radio communication network 100, such as the terminal 10. The transceiver 313 may thus include a radio receiver and transmitter for communicating through at least an air interface.

The access node 120 further comprises logic 310 configured to communicate data, via the radio transceiver, on a radio channel, with terminal 10. The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the access node 120 to carry out any of the method steps as provided herein. Software defined by said computer program code may include an application or a program that provides a function and/or a process. The software may include device firmware, an operating system (OS), or a variety of applications that may execute in the logic 310.

The access node 120 may further comprise or be connected to an antenna 314, connected to the radio transceiver 313, which antenna may include an antenna array. The access node 120, or alternatively only the antenna 314, may form a transmission point TRP for the access node 120.

The access node 120 may further comprise a communication interface 315, operable for the access node 120 to communicate with other nodes of the wireless network 100, such as the core network 110.

A NR carrier can at most be 275 resource blocks wide, corresponding to 275×12=3300 used subcarriers. This also defines the largest possible carrier bandwidth in NR for each numerology. However, there is a limit on the smallest and largest per carrier bandwidth. The largest bandwidth per carrier is limited to 400 MHz in Rel 15/16, although this may be extended to even larger bandwidths from Rel 17 and beyond. The smallest possible carrier bandwidth is limited to 11 resource blocks corresponding to ~2 MHz for a 15 kHz subcarrier spacing, required for fulfilling RF requirements on spectrum utilization. However, for the numerology used for a synchronization signal block (SSB), the terminal 10 needs to monitor a larger bandwidth, at least 20 resource blocks, i.e., 5 MHz for 15 kHz sub-carrier spacing, to find and synchronize to the carrier.

Through BWP adaptation, the terminal 10 can switch to a different BWP depending on the payload size, traffic and other factors, for power saving purposes. For example, the terminal 10 can use a narrow bandwidth for monitoring control channels and only open the full bandwidth when a large amount of data is scheduled. Upon completion of the data transfer requiring the wider bandwidth, the terminal 10 can revert back to the original bandwidth part. Presently, up to 4 BWPs can be configured when the terminal 10 is in connected mode, where one BWP is selected during the activity when communication between access node 120 and the terminal 10 occurs. Which BWP is used each time is selected by the network 100. After a period of inactivity on an active bandwidth part, the terminal 10 may switch to monitoring a default bandwidth part. The default BWP contains essential cell-specific information, such as synchronization signal block (SSB). Only one BWP, i.e. the default BWP part, is allowed when the UE is in idle mode. However, the bandwidth can never become smaller than the default BWP or the one needed to receive the synchronization signal, which means that the smallest BWP corresponds to 20 resource blocks.

Figure 4:
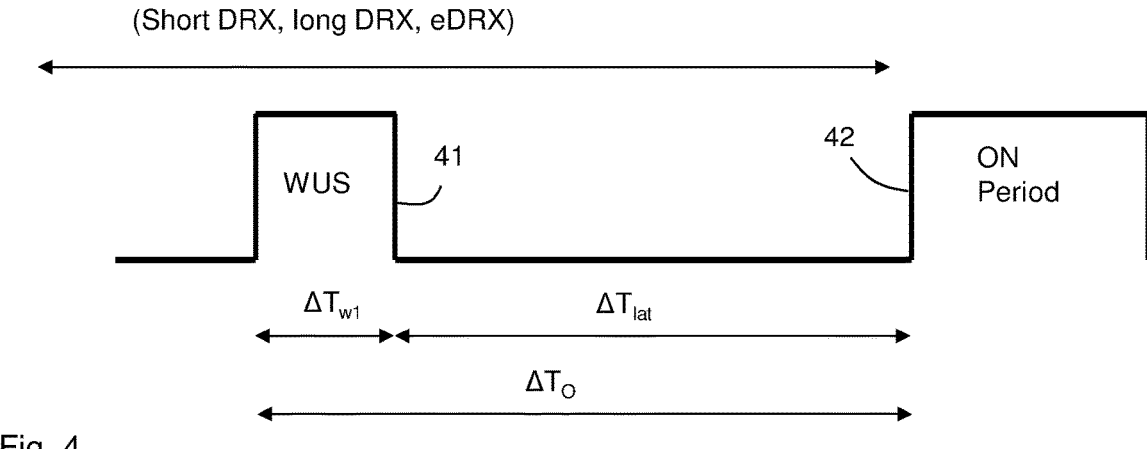
FIG. 4 schematically illustrates configuration of the time offset according to various embodiments.

FIG. 4 schematically illustrates various features of DRX operation according to embodiments outlined herein. DRX basically involves periodically repeated ON Periods 42 for the terminal usable for communication, separated by longer periods substantially void of communication. The wireless network 100 may be configured to operate under different types of DRX states, such as e.g. short DRX, long DRX and extended DRX (eDRX). Even within such different states, the DRX cycle length may be configured between different values. In operation, the terminal 10 starts monitoring detection of a WUS, i.e. a WUS occasion, within a window 41 which precedes a detection window 42 arranged to correlate with the On Period. The first window 41 for WUS detection is opened at the configured time offset $\Delta T_O$, which may also be denoted PS_offset, before the start of the On Period 42. The terminal 10 may be arranged to operate in the first window 41 for monitoring PDCCH with CRC scrambled by PS-RNTI, so as to detect a WUS within a configured active BWP. It may be noted that more than one monitoring occasion can be configured within a slot or multiple slots before the On Period. Considering WUS is encoded in the form of a PDCCH, in the following descriptions, it is also referred to as PDCCH_PS.

The time offset value $\Delta T_O$ is configured by the network 100. The configured time offset value $\Delta T_O$ needs to account for the length $\Delta T_{w1}$ of the PDCCH_PS monitoring range, i.e. the first window 41, such that the gap $\Delta T_{Lat}$ between the end of the PDCCH_PS monitoring range 41 and the start of the On Period 42 is sufficiently long to allow the terminal 10 to wake up to the extent that it can perform the subsequent operation during ON period, such as monitor PDCCH and decode PDSCH, encode PUSCH, transmit Channel State Information (CSI) report or some other function.

There are different possible UE architectures for a PDCCH_PS receiver usable for WUS detection, in a terminal 10. For a sufficiently simple PDCCH_PS signal, the receiver could be quite simple, for example being based on a correlator architecture, allowing for low power reception of PDCCH_PS. For such a low-power receiver, the PDCCH_PS can also take the form of a sequence. Such a low power receiver 213*b* can save power by not using the full circuitry of the main NR receiver 213*a*: once the low power receiver 213*b* has successfully identified a wake-up indicator in PDCCH_PS, the main NR receiver 213*b* would need to be woken up. This wake-up process can take a significant amount of time. When the PDCCH_PS signal is more complicated, it may be necessary to use some or all of the main NR receiver 213*a* to decode that signal. In this case, only a small amount of time may be required to fully wake-up the main NR receiver 213*a*.

Herein, various solutions are provided for defining a configurable mechanism or setting for selecting the time offset $\Delta T_O$ between start of monitoring occasion 41 of a power saving/wake-up signal, and the start of On Period 42. An objective is to configure the time offset $\Delta T_O$ so as to ensure that the terminal 10 has sufficient time for monitoring the power save/wake-up signal, e.g. PDCCH_PS, and also preparing for full receiver operation in the On Period 42, such as for decoding the PDCCH and the subsequent PDSCH or any other functions/operations, if a wake-up indicator is detected. Various embodiments will be described with reference to the operation characteristics of FIGS. 4 and 5, and to the signaling diagram of FIG. 6.

A general embodiment of a method for controlling a terminal 10 to receive signaling from a wireless network 100 during DRX may be carried out in the terminal and comprise:

determining 604 a time offset $\Delta T_O$ between a first window 41 for monitoring a wake-up signal, WUS, occasion and a subsequent second window 42 for monitoring signal reception responsive to receiving a WUS in the first window, wherein said time offset is dependent on a characteristic 62 associated with a downlink signal from the wireless network in accordance with a predetermined rule.

Application of the predetermined rule to determine the time offset typically takes place once the terminal is RRC connected.

Various embodiments may comprise obtaining 603 said characteristic 62 associated with a downlink signal from the wireless network; and determining the time offset in the terminal based on said characteristic using said predetermined rule.

In other embodiments, determining includes obtaining said time offset, or at least a parameter value for determining the time offset, in the terminal from the wireless network, such as in RRC signaling.

By employing a predetermined rule dependent on the characteristic associated with a downlink signal, dynamic configuration of the time offset $\Delta T_O$ is obtained, which allows for optimum selection of the offset based on the scenario at hand, and avoids stretching the time offset $\Delta T_O$ over a long period using a static value that addresses a worst-case scenario. This way, undue energy cost caused by monitoring at the terminal 10 is avoided. Moreover, latency may be reduced by minimizing the risk of traffic arriving between an inactive PS-PDCCH but before an On Period, which will not be available to the terminal 10 until the subsequent DRX cycle.

In the context of various embodiments, the characteristic 62 associated with a downlink signal may include DRX configuration information of an RRC connection between the wireless network 100 and the terminal 10, such as resource allocation and associated bandwidth range of WUS and the On Period. Dependent on the configuration determined by the network 100, the WUS and the subsequent On Period may be on the same BWP or on different BWPs. For example, the WUS may be in a default BWP and the On Period may have the potential to be in another BWP. In various embodiments, the time offset $\Delta T_O$ is dynamically configured based on BWP operation characteristics 62. This may involve determining the time offset $\Delta T_O$ dependent on e.g. BWP bandwidth, whether or not BWP switching is required and between which BWPs, etc. Example embodiments are outlined in FIGS. 5A-5C. One possible embodiment may include operation of a predetermined rule that if the terminal 10 monitors the default BWP for WUS, it uses a first $\Delta T_O$ and if it monitors the active BWP for WUS, it uses a second $\Delta T_O$.

FIG. 5A illustrates a scenario in which WUS and the On Period are configured on a common BWPa, which is a narrow BWP. In this context, narrow may be defined as not exceeding a certain predetermined bandwidth threshold, such as e.g. 5 MHz. As an example, BWPa may be a default BWP of 5 MHz. Determination of such a bandwidth threshold may be preconfigured by specification, be determined by the network 100, or be determined by the terminal 10 based on implementation and defined in UE capabilities. In the scenario of FIG. 5A, the terminal 10 may be preconfigured to operate a low-power receiver 213b for WUS detection, based on the BWPa being narrow.

FIG. 5B illustrates a scenario in which WUS and the On Period are configured on a common BWPb, which is a wide BWP. In this context, wide may be defined as exceeding a certain predetermined bandwidth threshold, such as e.g. 50 MHz or 100 MHz or 400 MHz. Determination of such a bandwidth threshold may be preconfigured by specification, be determined by the network 100, or be determined by the terminal 10 based on implementation and defined in UE capabilities. It can also be defined as being a BWP other than the default BWP. In the scenario of FIG. 5B, the terminal 10 may be preconfigured to operate the main receiver 213a for WUS detection, based on the BWPb being wide.

Figure 5C:
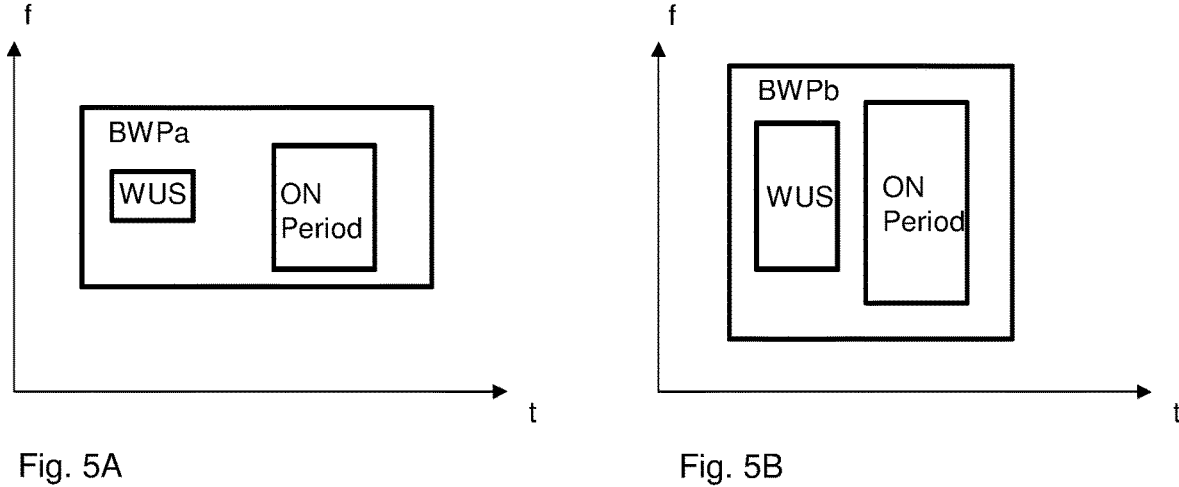
Figure 5C:
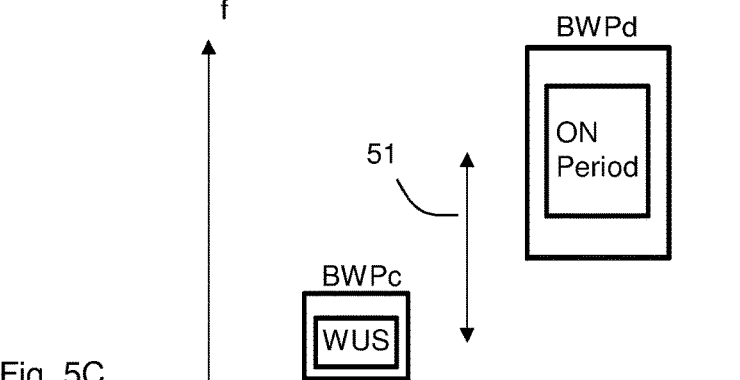

FIG. 5C illustrates a scenario in which WUS is configured in a first BWPc and the On Period is configured to have the potential to be in second BWPd. These two BWPs are separated by a certain frequency gap 51, which is dependent on how the BWPs are configured by the network 100.

Referring back to FIG. 4, the time offset $\Delta T_O$ is in various embodiments, exemplified by those of FIGS. 5A-5C, at least partly determined based on the BWP, at least as used for used for WUS, as characteristic 62. The time offset $\Delta T_O$ or for example the time gap $\Delta T_{BWP}$ between the end of the first window 41 and the beginning of the second window 42, is determined as function of BWP characteristics. In these embodiments, at least one parameter value of the time offset is determined dependent on at least the bandwidth range of the WUS. The parameter value may be a time period value $\Delta T_{BWP}$, or a e.g. a weight value $W_{BWP}$ to be applied to a constant time period value. The parameter value can vary depending on whether the UE needs to monitor a narrow-band active BWPa as in FIG. 5A or BWPc as in FIG. 5C, or a wideband active BWPb as in FIG. 5B, when monitoring for PDCCH_PS to determine a WUS occasion. A narrow active BWP allows for low-power reception but the switching time to larger BWP for PDCCH decoding at the On Period may be longer. A large active BWP is against the power saving purposes when monitoring PDCCH_PS but allows for shorter switching time when the UE transitions from PDCCH_PS monitoring to PDCCH decoding during the On Period. Furthermore, the parameter value may also vary depending on whether the terminal 10 is known to stay on the same active BWP between PDCCH_PS monitoring and the On Period, as in FIGS. 5A and 5B, or could potentially switch to another BWP as in FIG. 5C, since switching BWP may require a longer time gap $\Delta T_{Lat}$.

The parameter value used for determining the time offset can be dynamically changed depending on BWP scenario, e.g. knowledge a-priori that there will be no BWP change, potential to change to another BWP with changed bandwidth, potential to change to a BWP occupying a different frequency, potential to change to a BWP occupying a different frequency band, etc. In both scenarios of FIGS. 5A and 5B, the bandwidth range used for the On Period is known to a priori encompasses the bandwidth range used for the WUS. The terminal may know a-priori that there is a potential to change to a different BWP if the PDCCH_PS is configured with a "BWP switch" field. If such a field is present, the terminal knows that it could potentially be signaled to switch to another BWP. In this case, the time offset would have to be configured to allow for the worst case, which is where such a switch happens. The parameter value usable for one or various scenarios, or an identification of a rule set for determining the parameter value, may be obtained in the network 100 from predetermined definition in specifications, or may be signaled as UE capabilities.

Referring back to FIG. 4, the time offset $\Delta T_O$ may include a duration $\Delta T_{w1}$ of the first window 41. This denotes PDCCH_PS monitoring time and may have different values depending on whether the terminal 10 needs to monitor one or several occasions. The case of multiple monitoring occasions may be needed to provide more flexibility to the scheduler or to support multi-beam operation, which may be configured by the network 100 when the DRX is configured.

The time offset $\Delta T_O$ may in various embodiments include, or have a lower limit determined by, a minimum transition time value $\Delta T_{mrgn}$, which takes UE capability into account when transitioning from WUS detection (PS_state) to signal detection in the On Period (DRX_ON state). This minimum transition time value $\Delta T_{mrgn}$ may be dependent on UE implementation and be dependent on potential operation to be performed during DRX_ON. For example, if the terminal 10 could potentially be woken up by PDCCH_PS to monitor PDCCH during the On period, $\Delta T_{mrgn}$ may take a first value, and if the UE could potentially be woken up by PDCCH_PS to perform a CSI report during the On period, $\Delta T_{mrgn}$ may take a second value. The second value could be larger than the first value, for example if the terminal is required to perform multiple measurements to generate a CSI report. The terminal 10 may indicate if it has a specific time-gap requirement in the UE radio Capabilities. In addition, the access node 120 can also indicate whether it may support such a terminal. In various embodiments, the parameter value related to minimum transition time value $\Delta T_{mrgn}$ may be dynamically changed depending on scenario, e.g. short, long or extended DRX cycle. The value for the transition time value $\Delta T_{mrgn}$ may be obtained by applying a weight factor $W_{mrgn}$ to a constant value. The parameter values for the transition time value $\Delta T_{mrgn}$, or how they depend on DRX cycle, may also be signaled in UE radio as capabilities. The parameter value for the transition time value $\Delta T_{mrgn}$ may depend on the characteristics of the BWP that the PDCCH_PS is to be monitored on and hence the UE might report different UE capabilities for different BWP configurations. For example, for a narrow bandwidth part, the UE capability on the value of $\Delta T_{mrgn}$ could be relatively larger than the UE capability on the value of $\Delta T_{mrgn}$ used in a wider bandwidth part. This would reflect that the terminal could implement a lower power receiver in a narrower bandwidth, where this lower power receiver would mean that the main receiver would need to be woken up from a lower power state, requiring a longer boot-up or transition time for the main receiver.

In various embodiments, the time offset $\Delta T_O$ may be configured based on which function may potentially be executed by the terminal 10 during the second window 42 containing the ON Period. Different functions or operations may include monitoring PDCCH for data reception, additional CSI-RS reception, CSI-reporting, PDSCH monitoring, etc. Thereby each operation may have a corresponding time offset $\Delta T_O$. In some embodiments, each function may have an associated parameter value, such as a time value $\Delta T_{Func}$ or a weight factor $W_{Func}$ to be applied to a constant value for determining the time offset $\Delta T_O$. The potential subsequent operation may in one embodiment be indicated in, or determined based on, a downlink signal obtained in a previous On Period or in a previous WUS. In one embodiment, the parameter value $\Delta T_{Func}$ or $W_{Func}$ is a constant value adapted for a worst case scenario.

In various embodiments, the time offset $\Delta T_O$ may be configured based on a property of the WUS. The WUS is configured by the network 100, and the properties of the WUS may be communicated to the terminal 10 in RRC signaling. Such WUS properties may include e.g. sequence type, encoding, center frequency, bandwidth, scrambling, repetition etc. Dependent on one or more of these properties, the terminal 10 may require a shorter or longer time offset $\Delta T_O$. Dependent on the implementation of the terminal 10, the properties may have different effect on the required time offset $\Delta T_O$. In some embodiments, each different property or value of those properties may have an associated parameter value, such as a time value $\Delta T_{WUS}$, or a weight factor $W_{WUS}$ to be applied to a constant value for determining the time offset $\Delta T_O$.

In various embodiments, the time offset $\Delta T_O$ may be determined as an aggregation or sum of at least $\Delta T_{Lat}$ and $\Delta T_{w1}$. The time gap $\Delta T_{Lat}$ and may be determined as an aggregate of different time parameter values, including one or more of $\Delta T_{BWP}$, $\Delta T_{mrgn}$ and $\Delta T_{Func}$. In some embodiments, the time offset $\Delta T_O$ may be determined as a sum of at least $\Delta T_{Lat}$ and $\Delta T_{w1}$, where $\Delta T_{Lat}$ is determined as the maximum parameter value of two or more different types of time parameters, e.g. included in the group of $\Delta T_{BWP}$, $\Delta T_{mrgn}$, $\Delta T_{Func}$ and $\Delta T_{WUS}$.

The configuration of time offset $\Delta T_O$, or one or more parameters used for determining the time offset $\Delta T_O$, may e.g. be done through initial configuration of BWP and monitoring occasions, e.g. via RRC signaling. In various embodiments, dynamic determination selection of the time offset $\Delta T_O$ may be carried out for each DRX cycle, e.g. by calculation using weight factors or by selection from a group of pre-calculated or predetermined values. This may be carried out based on the current scenario, dependent on characteristics defining e.g. possible change of BWP, bandwidths of the BWPs, length of the DRX cycle, On Period function, WUS property etc., such as in accordance with any of the embodiments outlined herein.

The characteristic required in the terminal 10 for determining the time offset $\Delta T_O$ may thus be obtained from downlink signaling, e.g. RRC signaling. Moreover, property data stored in the terminal, which may be dependent on terminal capability, may be used for determining the time offset. The stored property data may include e.g. one or more groups of parameter values, such as time parameter values or weight values. The logic 210 of the terminal may be configured to identify a parameter value dependent on obtained characteristics and apply them to determine the time offset $\Delta T_O$. In one embodiment, the terminal 10 UE is configured with RRC signaling to have different the time offset $\Delta T_O$ for the default BWP and an active BWP.

An access node 120 of the wireless network 100 may configure the time offset $\Delta T_O$. In various embodiments, this configuration is made dependent on characteristics of the DRX for communication with the terminal. Moreover, property data associated with the terminal 10 is employed for determining the time offset $\Delta T_O$. The property data may be determined from UE capabilities, obtained at initial access, and/or as predetermined specified values. The property data may include e.g. one or more groups of parameter values, such as time parameter values or weight values. The logic 310 of the access node may be configured to identify a parameter value dependent on the present characteristics and apply them to determine the time offset $\Delta T_O$.

Figure 6:
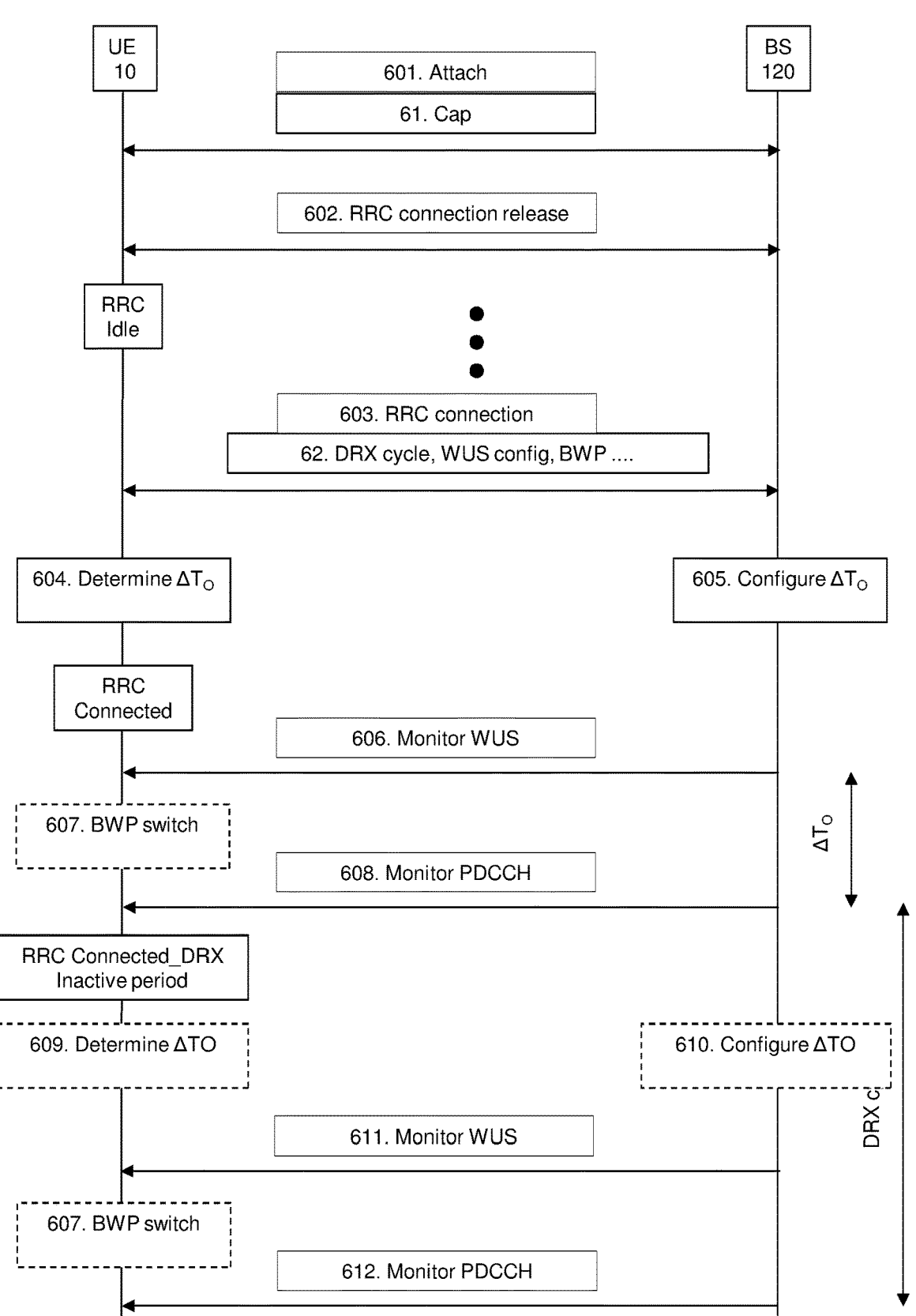
FIG. 6 schematically illustrates a signaling diagram presenting various embodiments.

FIG. 6 schematically illustrates a signaling diagram, correlating with the embodiments outlined with reference to the preceding drawings. The drawing illustrates the terminal 10 to the left and the access node 120, forming part of the network 100, to the right.

In a step 601, initial attach of the terminal 10 to the network 100 is carried out. It may be noted that this does not have to be carried out with the same access node 120 as subsequently used in DRX communication. In the attach procedure, UE capabilities 61 for the terminal 10 are identified to the network, either directly from the terminal 10 or through the core network 110 based on an identification of the terminal 10. The UE capabilities may include information identifying various properties of the terminal to the wireless network, associated with DRX operation. The information may e.g. identify parameter values, such as time parameter values and/or weight factors, usable for determining a time offset $\Delta T_O$ dependent on characteristics of DRX operation, as described herein.

In step 602, RRC connection release after attach may occur. The terminal 10 may thereafter be configured in idle state.

In step 603, connection setup is carried out, e.g. including RRC signaling, in order to transfer the terminal 10 to a connected state under DRX operation. Herein, characteristics 62 of the DRX operation are conveyed to the terminal 10, including e.g. the DRX cycle, WUS configuration, used BWPs and/or bandwidth ranges etc.

In step 604, the terminal 10 may determine the time offset $\Delta T_O$ to employ, based on the characteristic and a predetermined rule.

In step 605, the access node 120 may configure the time offset $\Delta T_O$, taking the terminal 10 and its properties into consideration. Notably, the configuration of the time offset $\Delta T_O$ my occur before or during connection setup 603.

When the connection setup 603 is completed, the terminal 10 is RRC Connected under DRX.

In step 606, the terminal monitors WUS, in a window 41 preceding an On Period by the time offset $\Delta T_O$, where the value of time offset $\Delta T_O$ depends on one or more characteristics of the BWP on which the WUS is transmitted, in some embodiments.

If required, a BWP switch is carried out in step 607.

In step 608, the terminal may operate in the On Period in a window 42, if a WUS was detected in a WUS occasion in step 606. In this context, a WUS occasion, from the terminal point of view, may include that the terminal 10 detected a WUS and determined that the WUS was intended for that terminal 10. This may e.g. include monitoring PDCCH.

The terminal 10 then enters an RRC Connected_DRX inactive period.

In step 609, the terminal may recalculate time offset $\Delta T_O$, e.g. if information was received in any of the first 41 and/or second window 42 that would cause a change in determination of the time offset $\Delta T_O$, for example if the terminal moves from monitoring a default BWP to an active BWP, the terminal may adopt a different one of the $\Delta T_O$ values that were determined in step 604. In other words, based on a predetermined rule (e.g. that a first value of $\Delta T_O$ is used when the characteristic of a downlink signal is that it is transmitted on a narrow bandwidth part and that a second value of $\Delta T_O$ is used when the characteristic of a downlink signal is that it is transmitted on a wider bandwidth part), the terminal dynamically determines whether to use the first value of $\Delta T_O$ or the second value of $\Delta T_O$, based on the dynamically changing status of whether the UE is monitoring the WUS on a narrow bandwidth part or wider bandwidth part. This would also entail that the access node 120 reconfigures 610 the $\Delta T_O$ in the corresponding manner.

Further On Periods may occur periodically according to the DRX cycle. In step 611 the terminal again monitors WUS, in a window 41 preceding a subsequent On Period by the time offset $\Delta T_O$, which may be the same or may have been changed from the previous period.

In step 612, the terminal may operate in the On Period in a window 42, if a WUS occasion was detected in step 611.

In various embodiments, the predetermined rule may involve determining a calculation rule, e.g. a certain selected algorithm or equation, for determining the time offset $\Delta T_O$, or one parameter forming part of or used in calculation of the time offset $\Delta T_O$. The predetermined rule may involve determining at least one parameter value of the time offset $\Delta T_O$ dependent on obtained characteristic 62. The time offset $\Delta T_O$ may be calculated using the determined parameter value. In some embodiments, the parameter value may be selected from a group of predetermined values, such as time values, dependent on the characteristics. Alternatively, or additionally, a weight factor may be used to adjust the time offset, or a part of the time offset, dependent on the characteristics. The weight factor may be calculated or be selected from a group of predetermined weight factors, dependent on the characteristic. In some embodiments the predetermined rule may involve aggregating at least two time values, of which at least one is determined, e.g. by selection or calculation using a weight or other formula, dependent on the obtained characteristics. Other rules than those exemplified may apply, which function to identify the time offset $\Delta T_O$, based on characteristics of the DRX operation and capability information of the terminal 10. In various embodiments, the predetermined rule is applied in the wireless network 100, based on which the time offset is determined and transmitted as information to the terminal 10, e.g. in RRC signaling. In other embodiments, the predetermined rule may be applied also in the terminal 10, so as to be able to determine the time offset dependent on characteristics associated with a downlink signal from the wireless network, such as resource or PWP allocation, or a function to be carried out in the On Period. The predetermined rule may in such embodiments be preconfigured in the terminal and may be based on specification documents.

In various embodiments, the terminal 10 can send capability information to the access node 120 relating to the time offset $\Delta T_O$ (also referred to as PS_offset) or the required time gap time offset $\Delta T_{Lat}$ between the end of the PDCCH_PS monitoring period 41 and the start of the DRX_ON duration 42. As an aspect of such embodiments, the terminal 10 may also provide UE assistance information with either a preferred gap or a preferred value of the time offset $\Delta T_O$.

There is a difference between UE capability and UE assistance information. UE capability information has to be adhered to by the access node, otherwise UE functionality will be unknown. UE assistance information, however, may be employed to provide the preferred configuration information of the terminal 10 to the access node 120. The access node 120 can override this preferred configuration with the preferred configuration of the access node 120.

In an embodiment of the invention, the terminal 10 has more than one PDCCH_PS decoding circuit/functionality 213a, 213b.

RX1: One of the PDCCH_PS decoding circuits 213b operates with a low power consumption (for example, the circuit can operate at a lower clock rate or with a lower supply voltage). This circuit has a higher latency. The higher latency could be due to the circuit taking longer to decode the PDCCH_PS or could be due to the circuit operating in a lower power state, hence requiring a longer boot-up process for the main receiver (where the main receiver is used in the DRX_ON duration).

RX2: The other PDCCH_PS decoding circuit 213a operates with a higher power consumption with a lower latency. For example, this higher power consumption decoding circuit could operate based on the circuitry of the main receiver.

Figure 7:
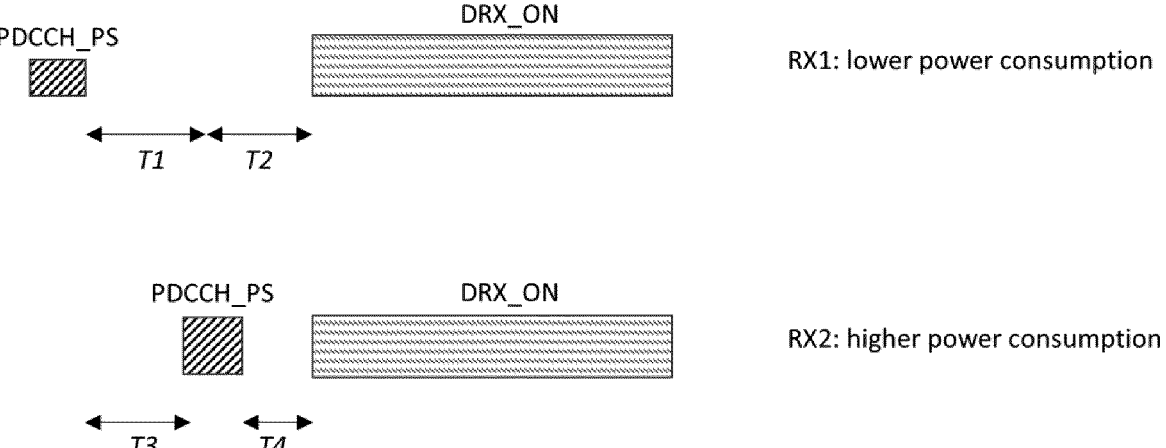
FIG. 7 schematically illustrates time parameters associated with DRX dependent on receiver configuration for WUS detection.

Operation with the two receiver types is shown in FIG. 7. The figure is split into a top part (illustrating operation with a lower power receiver RX1) and a bottom part (illustrating operation with a higher power receiver RX2). Operation with these two receiver types is described below:

RX1:

T1: Relaxed decoding of PDCCH_PS, e.g. based on operation with a lower clock frequency;

T2: Transition time related to booting up the main receiver for the DRX_ON duration;

Gap capability=T1+T2.

RX2:

T3: Time to boot-up the PDCCH_PS receiver;

T4: Time to decode the PDCCH PS. There is no additional transition time required since the RX2 PDCCH_PS receiver is based on the main receiver;

Gap capability=T4.

In such an embodiment, the terminal 10 reports the gap requirements for RX2 (the higher power, lower latency receiver) as a UE capability. When the traffic profile, as determined by the terminal 10, supports higher latency (i.e. slower performance), the terminal 10 reports, as UE assistance information, that it would prefer to be configured with a longer gap/longer PS_offset. In this latter case, the terminal 10 can operate using its lower power receiver (RX2) and hence save power.

In a related embodiment, the terminal 10 reports two capabilities to the access node 120: one capability for the lower power receiver (RX1) and one for the higher power receiver (RX2). The capability can include information on the amount of power consumption for each receiver type, in addition to the latency requirements of each receiver. In this case, the access node 120 may (re-)configure the terminal 10 with a different PS_offset/gap depending on the traffic profile observed at the access node 120. Alternatively, the terminal 10 may send an abbreviated piece of UE assistance information, indicating which PDCCH_PS receiver the terminal 10 wishes to be configured with.

In a related embodiment, the access node 120 signals to the terminal 10 limitations on the gap/PS_offset value that it is prepared to configure the terminal 10 with. For example, the access node 120 indicates a maximum PS_offset value that it is prepared to configure the terminal 10 with. The terminal 10 then only sends UE assistance information that is compatible with the limitation that the access node 120 had signalled. For example, if the access node 120 signals a limitation that it will only configure a PS_offset value of 10 slots or less, the terminal 10 does not send UE assistance information requesting a PS_offset configuration of more than 10 slots.

The terminal 10 may not know the configuration of the bandwidth parts at the time that it sends UE capability information. Hence in one embodiment, the terminal 10 can send a single capability to the access node 120, e.g. a gNB, which is the transition time gap capability for the faster WUS decoding circuit (e.g. the gap capability applicable for a WUS decoded using the main receiver 213a). The access node 120 configures the terminal 10 with a $\Delta T_O$ value that is compatible with this capability in order to ensure consistent and reliable UE operation. Once the terminal 10 had received details of the configured BWPs, it then sends UE assistance information to the access node 120, informing the access node 120 that for certain BWPs (such as narrower bandwidth parts) it could operate in a lower power mode for PDCCH_PS decoding at the expense of a longer transition time gap, through using a lower power receiver 213b. The access node 120 then decides whether to update the terminal's 10 BWP configuration with new $\Delta T_O$ values to allow for the longer transition time gap/lower power mode of operation on certain BWPs. In this embodiment, one or more of the following steps is applied:

Terminal 10 sends capability information on required gap between WUS and DRX ON period based on a first WUS receiver type Access node 120 configures the terminal 10 with bandwidth parts and associated $\Delta T_O$ values Terminal 10 sends assistance information to access node 120 with proposed values for $\Delta$TO for one or more of the bandwidth parts Access node 120 re-configures one or more of the configured bandwidth parts with updated $\Delta T_O$ values.

In accordance with the solutions presented herein, configuration of the length of the time offset $\Delta T_O$, such as the length of the gap $\Delta T_{Lat}$, is decided dynamically based on the DRX scenario, such as change of the BWP, frequency band, DRX cycle, etc. The value of the time offset $\Delta T_O$ may then be based on a mix of UE capabilities and values in the specification, determined based on the characteristic of the DRX operation based on a predetermined rule.

Various embodiments are outlined in the following clauses (C):

C1. A method for controlling a terminal to receive signaling from a wireless network during discontinuous reception, DRX, the method being carried out in the terminal and comprising determining (604) a time offset ($\Delta T_O$) between a first window (41) for monitoring a wake-up signal, WUS, occasion and a subsequent second window (42) for monitoring signal reception responsive to receiving a WUS in the first window, wherein said time offset is dependent on a characteristic (62) associated with a downlink signal from the wireless network in accordance with a predetermined rule.

C2. The method of C1, wherein said time offset ($\Delta T_O$) is dynamically determined based on said characteristic.

C3. The method of C1 or C2, comprising obtaining (603) said characteristic (62) associated with a downlink signal from the wireless network; and determining the time offset in the terminal based on said characteristic using said predetermined rule.

C4. The method of C1 or C2, wherein determining includes obtaining said time offset, or at least a parameter value for determining the time offset, in the terminal from the wireless network.

C5. The method of any preceding clause, wherein said characteristic includes an identification of a first bandwidth range (BWPa, BWPb, BWPc) used by the network for WUS, and wherein at least one parameter value ($\Delta T_{BWP}$, $W_{BWP}$) determining the time offset is dependent on said first bandwidth range.

C6. The method of C5, wherein the predetermined rule identifies a parameter value taken from a group of one or more preconfigured values, based on the width of said first bandwidth range, to determine the time offset.

C7. The method of C5 or C6, wherein said characteristic includes an identification of a second bandwidth range (BWPa, BWPb, BWPd) used in the second window, and wherein at least one parameter value is dependent on the second bandwidth range encompassing the first bandwidth range.

C8. The method of C7, wherein the predetermined rule identifies a parameter value taken from a group of one or more preconfigured values, which group is determined based on which bandwidth part the first bandwidth range and the second bandwidth range form part of, to determine the time offset.

C9. The method of any preceding clause, wherein said predetermined rule prescribes the time offset to meet or exceed a minimum transition time value for a receiver unit of the terminal.

C10. The method of any preceding clause, wherein said characteristic includes an identification of a DRX cycle, and wherein at least one parameter value ($\Delta T_{mrgn}$, $W_{mrgn}$) determining the time offset is dependent on said DRX cycle.

C11. The method of C10, wherein the predetermined rule identifies a parameter value taken from a group of one or more preconfigured values, based on the DRX cycle, to determine the time offset.

C12. The method of any preceding clause, wherein said characteristic includes an identification of property of the WUS, and wherein at least one parameter value ($\Delta T_{WUS}$, $W_{WUS}$) determining the time offset dependent on said WUS property.

C13. The method of C12, wherein the predetermined rule identifies a parameter value taken from a group of one or more preconfigured values, based on said WUS property, to determine the time offset.

C14. The method of C12 or C13, wherein said property of the WUS is one, or a combination, of sequence type, encoding, scrambling, center frequency, bandwidth.

C15. The method of C1, wherein said characteristic includes an identification of a function to be carried out in the DRX on period, and wherein at least one parameter value ($\Delta T_{Func}$, $W_{Func}$) determining the time offset dependent on said function.

C16. The method of C15, wherein the predetermined rule identifies a parameter value taken from a group of one or more preconfigured values, based on said function, to determine the time offset.

C17. The method of any preceding clause, wherein said predetermined rule prescribes the time offset to include an aggregate of a duration ($\Delta T_{w1}$) and a longest one ($\Delta T_{Lat}$) of a plurality of different time parameter values.

C18. The method of any preceding clause, wherein the DRX is operated in a connected state of the terminal.

C19. The method of any preceding clause, comprising transmitting, to the wireless network, capability information identifying one or more time parameter values usable for determining the time offset.

C20. The method of C19, wherein the capability information identifies at least one first time parameter value associated with a first WUS decoding functionality, and at least one second time parameter value associated with a second WUS decoding functionality.

C21. The method of C19 or C20, wherein the capability information identifies at least one first time parameter value associated with a required time offset, the method further comprising transmitting, to the wireless network, assistance data identifying a preferred time offset.

C22. The method of C21, comprising receiving, from the wireless network, an indication of a limitation on the time offset, wherein said preferred time offset is determined to meet said limitation.

C23. The method of C21, comprising determining a DRX traffic profile, wherein the assistance data is transmitted based on the character of the DRX traffic profile.

C24. The method of any preceding clause, comprising transmitting capability information to the wireless network, identifying a time parameter associated with a required gap between WUS detection and the second window based on a first WUS receiver type;

obtaining configuration from the wireless network of bandwidth parts and associated time offset ($\Delta T_O$);

transmitting assistance information to the wireless network identifying proposed value or values for time offset for one or more of the bandwidth parts;

obtaining reconfiguration from the wireless network identifying updated time offset information for one or more of the configured bandwidth parts.

C25. The method of any preceding clause, comprising monitoring a WUS occasion during said first window; and monitoring, responsive to determining a wake-up occasion, signal reception during said second window, wherein the first window is controlled to precede the second window by said time offset.

C26. A method for controlling an access node of a wireless network for communication with a terminal using discontinuous reception, DRX, the method being carried out in the access node and comprising determining DRX characteristic for communication with the terminal;

determining, using a predetermined rule dependent on said characteristic, a time offset between a first window for a wake-up signal, WUS, occasion and a subsequent second window for signal transmission in a DRX on period.

C27. The method of C26, wherein said predetermined rule prescribes the offset to be determined in accordance with any of C2-C25.

C28. The method of C26 or C27, comprising receiving, from the terminal, capability information and/ or assistance data identifying one or more of said at least one time parameter values usable for determining the time offset.

The invention claimed is:

1. A method for controlling a terminal to receive signaling from a wireless network during discontinuous reception (DRX) the method being carried out in the terminal and comprising:

transmitting capability information to the wireless network, relating to a required time margin between an end of a first window for monitoring a wake-up signal (WUS) occasion and a subsequent second window for monitoring signal reception responsive to receiving a WUS in the first window, wherein said time margin is dependent on bandwidth part (BWP) characteristics;

determining a time offset between a start of the first window and the subsequent second window for monitoring signal reception responsive to receiving a WUS in the first window;

determining a time gap between the end of the first window and the start of the second window based on a BWP characteristic associated with a downlink signal from the wireless network and the capability information utilized by the wireless network in accordance with a predetermined rule; and monitoring for the WUS in the first window defined by the time offset and the time gap.

2. The method of claim 1, wherein said time offset is dynamically determined based on said characteristic.

3. The method of claim 1, comprising obtaining said characteristic associated with a downlink signal from the wireless network; and determining the time offset in the terminal based on said characteristic using said predetermined rule.

4. The method of claim 1, wherein the determining includes obtaining said time offset, or at least a parameter value for determining the time offset, in the terminal from the wireless network.

5. The method of claim 1, wherein said characteristic includes an identification of a first BWP used by the network for WUS, and wherein at least one parameter value determining the time offset is dependent on said first BWP.

6. The method of claim 5, wherein the predetermined rule identifies a parameter value taken from a group of one or more preconfigured values, based on the width of said first BWP, to determine the time offset.

7. The method of claim 5, wherein said characteristic includes an identification of a second BWP used in the second window, and wherein at least one parameter value is dependent on the second BWP encompassing the first BWP.

8. The method of claim 7, wherein the predetermined rule identifies a parameter value taken from a group of one or more preconfigured values, which group is determined based on which bandwidth part the first BWP and the second BWP form part of, to determine the time offset.

9. The method of claim 1, wherein said predetermined rule prescribes the time offset to meet or exceed a minimum transition time value for a receiver unit of the terminal.

10. The method of claim 1, wherein said characteristic includes an identification of a DRX cycle, and wherein at least one parameter value determining the time offset is dependent on said DRX cycle.

11. The method of claim 10, wherein the predetermined rule identifies a parameter value taken from a group of one or more preconfigured values, based on the DRX cycle, to determine the time offset.

12. The method of claim 1, wherein said characteristic includes an identification of property of the WUS, and wherein at least one parameter value determining the time offset dependent on said WUS property.

13. The method of claim 12, wherein the predetermined rule identifies a parameter value taken from a group of one or more preconfigured values, based on said WUS property, to determine the time offset.

14. The method of claim 12, wherein said property of the WUS is one, or a combination, of sequence type, encoding, scrambling, center frequency, bandwidth.

15. The method of claim 1, wherein said characteristic includes an identification of a function to be carried out in the DRX on period, and wherein at least one parameter value determining the time offset dependent on said function.

16. The method of claim 1, further comprising:

transmitting capability information to the wireless network, identifying a time parameter associated with a required gap between WUS detection and the second window based on a first WUS receiver type;

obtaining configuration from the wireless network of bandwidth parts and associated time offset;

transmitting assistance information to the wireless network identifying proposed value or values for time offset for one or more of the bandwidth parts; and obtaining reconfiguration from the wireless network identifying updated time offset information for one or more of the configured bandwidth parts.

17. The method of claim 1, further comprising:

monitoring a WUS occasion during said first window; and monitoring, responsive to determining a wake-up occasion, signal reception during said second window, wherein the first window is controlled to precede the second window by said time offset.

18. The method of claim 1, further comprising determining a time gap between the end of the first window and the start of the second window.

19. The method of claim 1, further comprising determining the time offset for each DRX period.

20. A method for controlling an access node of a wireless network for communication with a terminal using discontinuous reception (DRX), the method being carried out in the access node and comprising:

receiving, from the terminal, capability information and/or assistance data identifying one or more time parameter values usable for determining a time offset, wherein the one or more time parameter values include a time margin dependent on bandwidth part (BWP) characteristics;

determining DRX characteristic for communication with the terminal, wherein the DRX characteristic include at least BWP characteristics utilized for communication and a time offset between a start of a first window for a wake-up signal (WUS) occasion and a subsequent second window for signal transmission in a DRX on period; and determining, using a predetermined rule dependent on said characteristic and the capability information received, a time gap between an end of the first window for the wake-up signal (WUS) occasion and the subsequent second window for signal transmission in the DRX on period.

21. The method of claim 20, wherein the DRX characteristics includes a bandwidth part (BWP) characteristic for the communication with the terminal.

* * * * *